Figure 3:
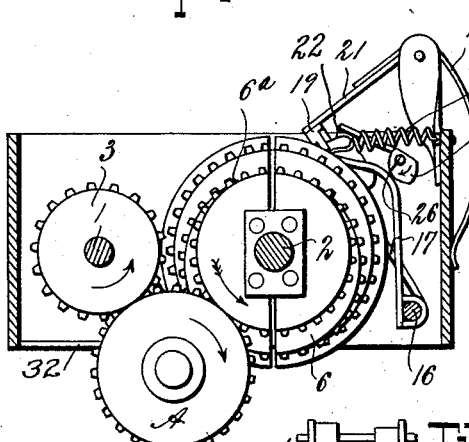

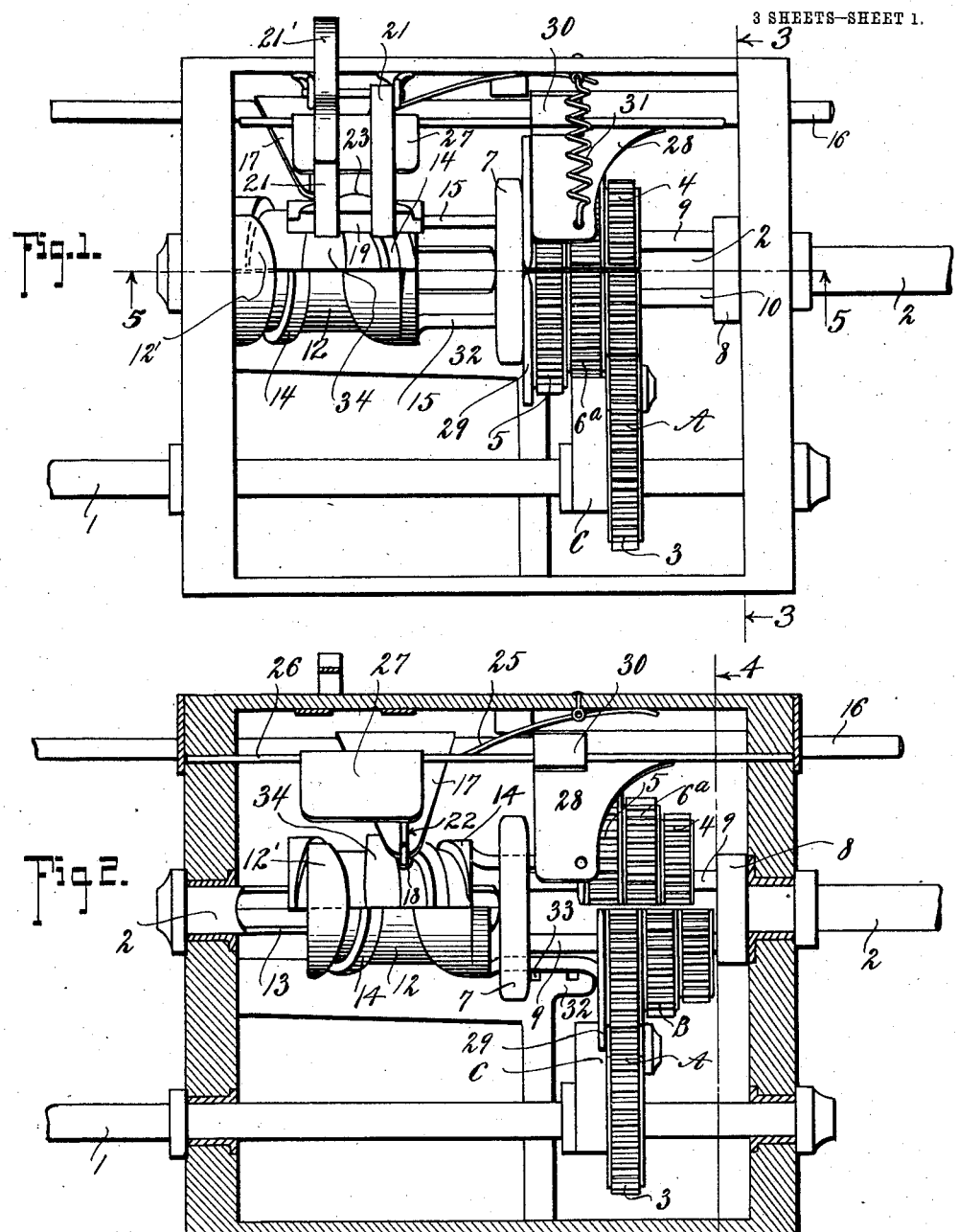

R. H. GERARD.
VARIABLE SPEED TRANSMISSION GEARING.
APPLICATION FILED JULY 10, 1911. RENEWED MAY 15, 1912.

1,048,065.

Patented Dec. 24, 1912.

WITNESSES:
Charles H Wagner,
E Larson

INVENTOR
Roy H. Gerard
BY Robb
Attorneys

R. H. GERARD.
VARIABLE SPEED TRANSMISSION GEARING.
APPLICATION FILED JULY 10, 1911. RENEWED MAY 15, 1912.
1,048,065.
Patented Dec. 24, 1912.
3 SHEETS—SHEET 3.
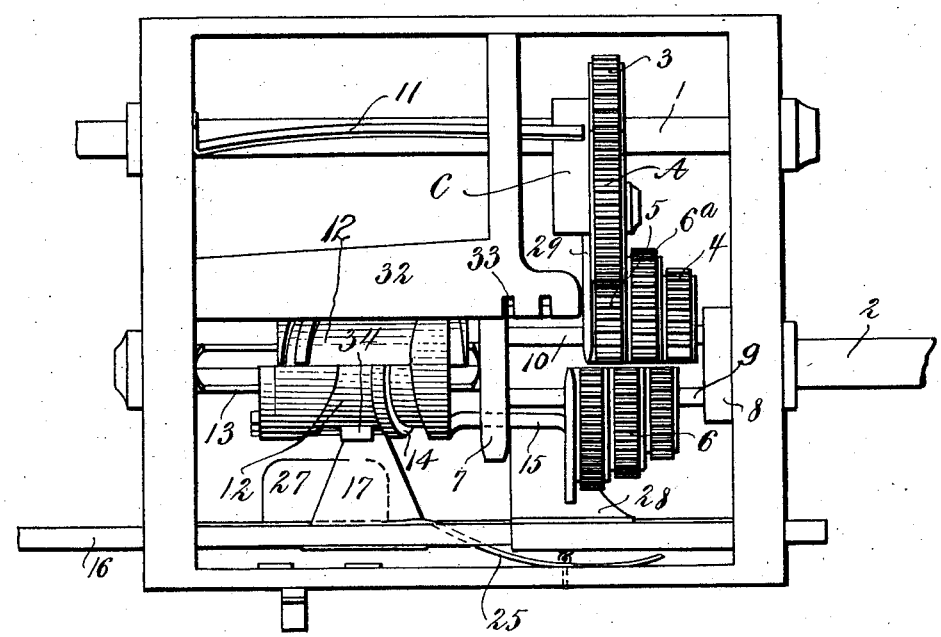
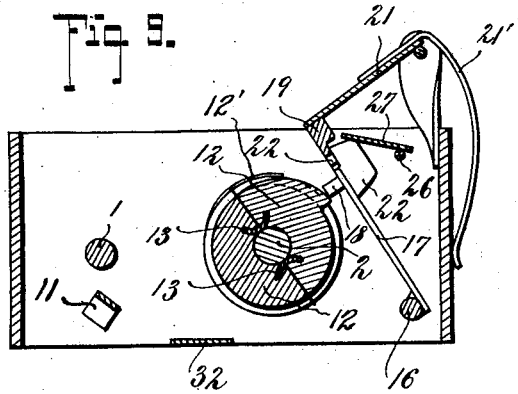
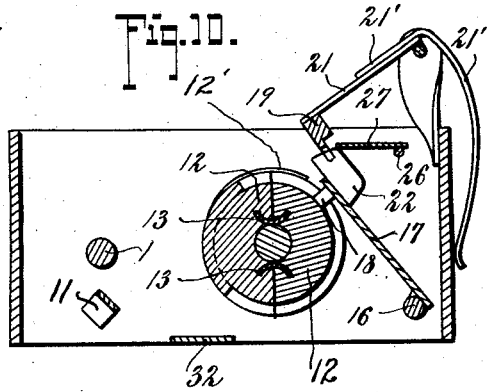
WITNESSES:
Charles H Wagner
E Larson
INVENTOR
Roy H. Gerard
BY
Attorneys

UNITED STATES PATENT OFFICE.

ROY HANMORE GERARD, OF BERKELEY, CALIFORNIA.

VARIABLE-SPEED-TRANSMISSION GEARING.

1,048,065.      Specification of Letters Patent.     Patented Dec. 24, 1912.

Application filed July 10, 1911, Serial No. 637,648. Renewed May 15, 1912. Serial No. 697,543.

*To all whom it may concern:*

Be it known that I, ROY HANMORE GERARD, a citizen of the United States, residing at Berkeley, in the county of Alameda and State of California, have invented certain new and useful Improvements in Variable-Speed-Transmission Gearing, of which the following is a specification.

This invention embodies primarily certain improvements in variable speed gearing for power transmission purposes, and relates particularly to that type of gearing in which the drive and driven gear members are always in mesh.

Among the objects of this invention are to obtain a positive drive mechanism, and one in which the change from one speed to another is regular and gradual under all conditions of service, to so arrange the gear elements that the part transmitting power does not have to be moved, and to provide special operating means whereby little or no effort or force is required to accomplish a change of speed irrespective of the load being carried.

The invention consists further in the provision of operating mechanism including a certain shifting device for one of the gear members enabling the operator to return it to its original position if it has not been moved sufficiently, or " clear over ", this being advantageous to afford perfect control. The shifting means furthermore is so associated with the gearing that it is operably engaged with the moving parts only when actuating the same, and hence the mechanism is normally relieved of wear and friction from this source.

The invention contemplates the employment of peculiar means for locking certain movable parts of one of the gear members until the shifting device is thrown into operative relation thereto, the latter device being adapted to control the locking mechanism in a manner to be more fully developed hereinafter.

An essential feature of the invention in its broader aspect, is the utilization of coöperating gear members, one of which is composed of gears of different sizes with a gear path leading from the pitch line of a smaller gear to that of a larger gear, said different sized gears being made in relatively movable sections capable of being shifted in order to effect engagement of any one of said gears with the coöperating gear member.

For a full understanding of the present invention, reference is to be had to the following description and to the accompanying drawings, in which—

Figure 4:
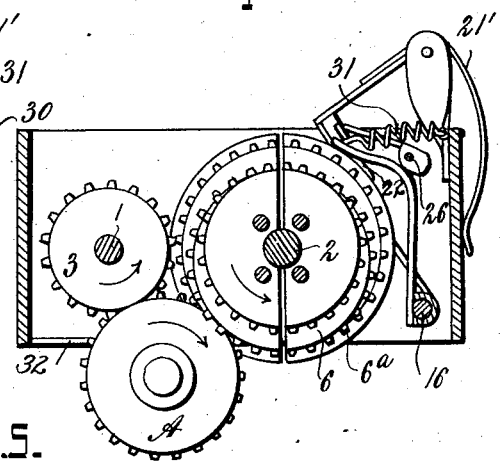
Figure 5:
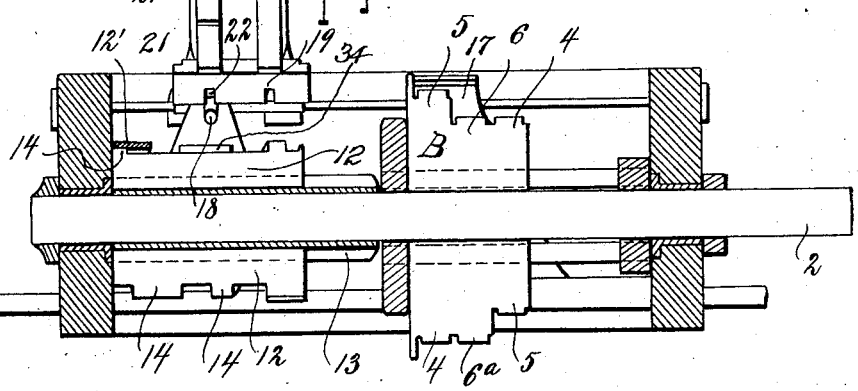
Figure 6:
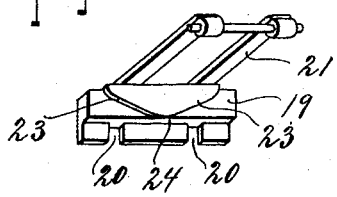
Figure 7:
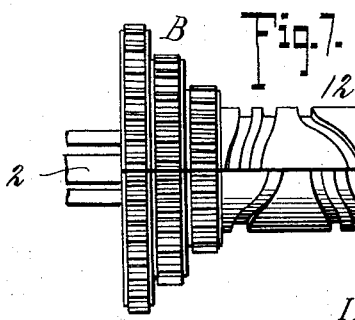

Figure 1 is a plan view of a variable speed gearing constructed in accordance with the invention; Fig. 2 is a view somewhat similar to Fig. 1, partly in section, omitting the yielding bracket, the gear sections of one of the gear members being shifted showing the manner of operation of the same; Fig. 3 is a section on the line 3—3 of Fig. 1; Fig. 4 is a view similar to Fig. 3, being a section on the line 4—4 of Fig. 2; Fig. 5 is a section taken on the line 5—5 of Fig. 1; Fig. 6 is a detailed perspective view of the locking bar and supporting bracket; Fig. 7 is a view of a modification; Fig. 8 is a plan view reversed to those shown in Figs. 1 and 2 and showing more clearly certain parts of the transmission mechanism; Figs. 9 and 10 are sectional views taken through the shifting sleeve and rocker arm, the position of the latter in Fig. 9 being raised from the cams of the sleeve while in Fig. 10 the rocker arm is in a position in which its shifting pin is operably engaged with the cams on the sleeve.

Throughout the following detail description and on the several figures of the drawings, similar parts are referred to by like reference characters.

Describing the invention specifically and referring to the drawings, 1 denotes a drive shaft and 2 a driven shaft, a suitable drive gear 3 being mounted on the first mentioned shaft and meshing with a gear member A which in turn coöperates with a second gear member B mounted upon the driven shaft 2, said gear member B being composed of a plurality of gears, preferably of the spur type and designated as 4 and 5. The gears 4 and 5 are of different diameters so that when they are brought into engagement with the gear member A variable speed of the driven shaft may be produced.

Interposed between the gears 4 and 5 is a gear 6 eccentric with respect to said gears 4 and 5, the latter being concentrically mounted upon the shaft 2. The arrangement of the eccentric gear 6 is such that the pitch line of said gear at diametrically opposite points is in alinement with the pitch lines of the respective gears 4 and 5 at diametrically opposite points of the latter and therefore the gear 6 provides a gear path 6ª which leads from the pitch line of the gear 4 to that of the gear 5, said gear path having a substantially spiral arrangement in respect to the pitch lines of the speed changing gears mentioned.

The mounting of the gears of the gear member B is peculiar, all of said gears being connected together and being split transversely thereof to provide relatively movable gears sections of semi-circular form, the flat portions of said sections being adapted to slide in contact with one another. On the shaft 2 is mounted a pair of cross heads 7 and 8 connected by the guides 9 and 10. The guide 9 passes through one of the gear sections of the member B and the guide 10 through the other section, and special means are provided for sliding or shifting the gear sections of the member B with respect to the gear member A to cause transition of the latter member from a smaller gear to a larger gear of the member B or vice versa, thus effecting the speed changes at will.

A peculiar and advantageous feature of the invention resides in the fact that the transition of the gear member A from operative engagement with a certain gear of the member B to another gear of said member, is effected automatically after the shifting device has been manually adjusted at the proper position, practically no effort therefore being required in the speed changing operation.

It is to be noted that the gear member A is mounted upon a pivoted arm C, the axis of which is the shaft 1 and a spring 11 is preferably employed to resiliently hold the gear member A in operative engagement with the gear member B. The shifting device employed is designed to impart successive movements to the gear sections of the gear member B in relation to the gear member A whereby, for instance, when it is desired to change speed, assuming that the gear member A is in engagement with the high speed gear 5, the gear sections will be so shifted and their movements properly timed as to cause one of said sections to be moved laterally while the gear member A is traveling on one-half of the gear 5, in order to bring the gear path 6ª opposite said half of the gear 5, the gear member A being thus engaged with a half of the gear path. Since the gear path 6ª leads from the pitch line of the smaller gear to the pitch line of the next larger gear, designated 4 in the drawings, it will be apparent that the arm C is forced outwardly as the gear member A is moving from the inner end of the gear path 6ª to its outer end, or that portion in alinement with the pitch line of the larger gear 4. The gear section of the member B opposite the half of the gear path 6ª with which the member A is engaged will be moved meanwhile until a half of the gear 4 is opposite the gear path, whereupon the member A is engaged with said half of the larger gear 4. The other half of the larger gear, by a subsequent movement of the gear section of which it forms a part, is then brought opposite that half of the gear 4 with which the gear member A is engaged so that the latter now coöperates with the member 4 entirely, the transition of the gear member A from the smaller gear 5 to the larger gear 4 being completed. The operation is just the reverse in changing speed from low to high or transferring engagement of the gear member A from the gear 4 to the gear 5 of the gear member B. It is to be understood furthermore that while only two speeds may be produced by the operation of the parts thus far described by merely adding an additional gear path and additional different sized gear for each speed to those above referred to, any desired number of speeds may be secured.

Passing now to the mechanism employed for shifting the gear sections of the member B in the manner hereinbefore described, it will be noted that, supported on the shaft 2 also is a shifting device consisting of a sleeve 12 longitudinally split to form sleeve sections. Said sleeve 12 is splined on the shaft 2, as shown at 13 and the sections of the sleeve are provided with shifting cams 14, preferably of somewhat spiral formation. Each section of the sleeve 12 is connected with one of the gear sections of the member B by means of a rod 15 which passes through a suitable opening in the adjacent cross head 7. It is not necessary, however, that the shifting device be spaced from the gear member B necessitating the use of the connecting rods 15 since the arrangement shown in Fig. 7 of the drawings may be employed in which the sections of the sleeve 12 are directly connected with the adjacent corresponding sections of the gear member B.

In parallel relation to the shaft 2 is located a rock shaft 16 which slides freely in a longitudinal manner in suitable bearings in the frame in which the transmission gearing described is mounted. A rocker arm 17 on the shaft 16 carries a shifting pin 18 which is adapted to be moved toward and from, into and out of engagement respectively with the cams 14 which are carried by the sections of the sleeve 12.

A locking bar 19 having notches 20, one for each speed adapted to be produced in the operation of the invention, is located adjacent to the free end of the rocker arm 17 and said bar 19 is carried by a yielding bracket 21. On the upper end of the arm 17 is a projection 22 having sliding engagement at its upper extremity with oppositely inclined cams 23 arranged longitudinally of the bar 19 at one side thereof, a side of the projection 22 being adapted to operate in a longitudinal recess 24 near the outer edge of the bar 19 and on the same side as the cams 23 aforesaid. A spring 25 normally tends to turn the shaft 16 to force the pin 18 into engagement with the sleeve 12, but said pin cannot be engaged with the sleeve until the projection 22 is brought into register with one of the notches 20. A lock shaft 26 is arranged parallel and adjacent to the shaft 16 and has an actuating arm 27 which is normally in contact with the outer side of the rocker arm 17 so that the movements of the arm 17 will be imparted to the arm 27. On the shaft 16 is carried a locking arm 28 which depends into engagement with a locking rim arranged at one side of the gear 4 secured to said gear and split to provide sections movable with the corresponding sections of the member B. The locking arm 28 so coöperates with the rim 29 as to lock the member B after the latter has been moved bodily by successive alternate movements of its gear sections in either direction, a many sided cam 30 being provided on the shaft 26 to engage with the outer side of the arm 28 to move said arm into locking position, on turning of the shaft 26, according to the position of the shifting pin 18, as will now be more fully described.

A spring 31 normally tends to pull the locking arm 28 out of locking position with respect to the rim 29. In addition to the movable locking arm 28, which coöperates with the rim 29 at a point above the member B, it is contemplated to provide nearly at a diametrically opposite point, with respect to the member B, a lock plate 32 suitably supported by the frame work in which the transmission gearing is mounted, said lock plate having notches 33 in which the sections of the rim 29 are adapted to operate as they are turned in the speed changing movement of the gear sections of the member B. The gear 4 is engaged with the member A while the rim 29 is locked from movement in the direction of the sleeve 12 by the abutting extremity of the plate 32, whereas, when the gear member A and the gear 5 are in mesh, the innermost notch 33 of the plate performs a locking function with respect to the rim 29. As the sections of the sleeve 12 are shifted in either direction, the portion of the rim 29 carried by each section operates through the outer notch 33 of the plate 32 as said section turns in its mid-position, and said outer notch locks the section with which it engages from movement while the gear member A coöperates therewith.

Describing now more clearly the operation of the shifting device, it will be apparent that normally the shifting pin 18 will be held out of engagement with the sleeve 12 by the engagement of the projection 22 with the locking bar 19. Should it now be desired to effect a change of speed of the driven shaft 2, the operator by the actuation of suitable means, impacts longitudinal movement to the rock shaft 16, such movement causing the lower end of the projection 22 to ride downwardly on the adjacent cam 23 until it reaches the central portion of the recess 24, the upper side of said recess being flush with the lowermost portion of the cam permitting the projection 22 to spring into the recess 24 whereupon further movement of the rock shaft will bring the projection opposite a notch 20 into which the projection enters until the shifting pin engages with the sleeve 12. Since the sleeve 12 is rotating constantly, it will be apparent that the pin 18 will begin to operate immediately on the cams 14 which are so arranged that successive movements will be imparted to the sections of the sleeve 12, such movements being correspondingly imparted to the sections of the gear member B which are connected with the sleeve. The cams 14 are arranged in oppositely inclined sets so that when the pin 18 is engaged with a set of cams at one end of the sleeve, the sections of the gear member B will be moved in one direction, whereas when the pin 18 is engaged with the sleeve 12 at its opposite end, the gear sections will be moved in the opposite direction in an obvious manner.

One of the sections of the sleeve 12 carries a releasing cam 34, the purpose of which is to force the pin 18 outwardly from the sleeve 12 after said pin has traveled along either set of cams 14 in the speed changing operation and when the pin 18 has been moved outwardly to the limit of its movement by the releasing cam 34, the bracket 21 which resiliently supports the bar 19 is forced downwardly so as to cause engagement of the projection 22 with said bar and lock the rocker arm 17 in a position wherein the pin 18 is no longer in operative engagement with the sleeve 12, but free to be moved by the shaft 16 for effecting entire speed changing operation.

During the operation of the shifting device as above described, when the shifting pin 18 is moved into initial engagement with the sleeve 12, the arm 17 which was previously holding the actuating arm 27 elevated permits slight downward movement of the arm 27 turning the locking cam 30 sufficiently to permit the spring 31 to pull the locking arm 28 out of its locking position with respect to the rim 29. During all the time the shifting of the gear sections of the member B was taking place, the arm 28 was held out of its locking position with respect to the arm 29, but immediately the shifting pin 18 was forced into its normal position where it is held by the locking bar 19, the arm 17 forced the actuating arm 27 outwardly turning the lock shaft and causing the cam 30 to move the locking arm 28 into its operative locking position with respect to the rim 29. In other words, just as soon as the shifting pin engages the sleeve 12 through the medium of the arm 27, the lock shaft 26, cam 30 and locking arm 28, the gear member B is released and free to be moved bodily, as described. Just as soon, however, as such movement is completed and the new speed produced, the restoration of the pin 18 to its normal position returns the locking arm 28 to its normal position holding the gear member B locked in its new position.

It will be noted that the various gears of the member B as well as the gear member A are provided with shroudings at the pitch lines, preferably, however, the depth of the teeth, these shroudings forming rolling contact surfaces maintaining the gears in exact mesh and reducing friction. The shroudings are especially advantageous having in view the resilient pressure of the gear member A against the gear member B in their operative arrangement.

Owing to the mounting of the gear member A upon a swinging arm, the kicking-back or sudden reversing of the drive shaft from any cause will merely lift the member A out of mesh with respect to the member B, removing strain from various parts of the gearing. It will be noted also that the sections of the gear member cannot be moved except by means of the shifting pin 18 which controls the locking and releasing of said gear sections. Furthermore, the pin 18 cannot be raised from operative engagement with the shifting cams of the sleeve 12 until the gear shifting operation in respect to the member B is entirely completed.

If desired, the arm C may be moved to enmesh the gear members A and B at any time if desired, this being a preferable arrangement if the reversing mechanism is employed or if the clutch is to be dispensed with.

While the preferred embodiment of the invention has been set forth herein, it will be understood that I am not limited to the specific arrangement and exact construction of parts as illustrated and described. The various results achieved in the employment of the invention may be produced by an arrangement of parts substantially equivalent to those employed but affording a more simple arrangement or otherwise, as may be necessary under practical conditions of service.

Curved plates 12' are carried by the sections of the sleeve 12 and overlap the outer ends of the shifting cams 14 in the normal position of the parts, said plates being movable with the sleeve sections to expose said portions of the cam for coöperation with the pin 18, in the operation of transition of one speed to another. Certain of the spring parts may, of course, be differently arranged, this being immaterial to the invention. The yieldability of the bracket 21 is afforded by a spring 21' bearing against said bracket.

It will be apparent that the notches 20 and member 19 serve to hold the rock arm 17 from endwise movement when the cams of the sleeve 12 begin to operate to shift the movable gear sections of the member B.

Having thus described my invention, what is claimed as new is:

1. In variable speed gearing, the combination of coöperating gear members, one of said gear members comprising a plurality of gears of different diameters, shifting means for moving said gears for effecting transition of the other gear member from a gear of one diameter to a gear of a different diameter, means for locking said gears from movement, and means operable by the shifting means aforesaid for releasing the gears to permit the transition movement aforesaid.

2. In variable speed gearing, the combination of coöperating gear members, one of said gear members comprising a plurality of gears of different diameters movable in relation to the other gear member to effect engagement of the latter with any one of the former, automatic means for shifting said gears for speed changing purposes, locking means normally preventing speed changing movement of the gears, and means for rendering the automatic shifting means operable and simultaneously releasing the gears.

3. In variable speed gearing, the combination of coöperating gear members, one of said gear members comprising a plurality of gears of different diameters movable in relation to the other gear member to effect engagement of the latter with any one of the former, automatic means for shifting said gears for speed changing purposes, locking means normally preventing speed changing movement of the gears, means for rendering the automatic shifting means operable and simultaneously releasing the gears, and means for relocking the gears at the end of their speed changing movement.

4. In variable speed gearing, the combination of coöperating gear members, one of said gear members comprising a plurality of gears of different diameters movable in relation to the other gear member to effect engagement of the latter with any one of the former, means for shifting said gears for speed changing purposes, locking means normally preventing speed changing movement of the gears, and means for rendering the automatic shifting means operable connected with the locking mechanism to release and again lock the gears at the beginning and end respectively of their shifting movement.

5. In variable speed gearing, the combination of coöperating gear members, one of said members consisting of a plurality of gears of different diameters, means for shifting said gears to effect engagement thereof of any one of the same with the other gear member, a locking device normally preventing movement of the gears, a shifting pin movable into and out of engagement with the shifting device for controlling the operation of the latter, and means connecting the shifting pin with the locking mechanism whereby the latter is controlled therefrom.

6. In variable speed gearing, the combination of coöperating gear members, one of said gear members consisting of gears of different diameters, a shifting device for said gears normally connected for rotation therewith and normally inoperative, a locking device for the gears normally preventing speed changing movement of the same, and means for coöperation with the shifting device for rendering the same operative and inoperative at will.

7. In variable speed gearing, the combination of coöperating gear members, one of said gear members consisting of gears of different diameters, a shifting device for said gears normally connected for rotation therewith and normally inoperative, a locking device for the gears normally preventing speed changing movement of the same, means for coöperation with the shifting device for rendering the same operative and inoperative at will, and connecting means between the last mentioned means and the locking means whereby the latter is controlled by the former.

8. In variable speed gearing, the combination of coöperating gear members, one of said gear members consisting of a plurality of gears of different diameters, gear paths leading from the pitch line of each gear to the pitch line of an adjacent gear, said gears comprising gear sections, and means for shifting the gear sections alternately relative to one another to cause transition of the other gear member from a gear of one diameter to a gear of a different diameter.

9. In variable speed gearing, the combination of coöperating gear members, one of said gear members consisting of gears of different diameters, a shifting device for said gears normally connected for rotation therewith and normally inoperative, a rock shaft, a shifting pin movable by said rock shaft into and out of engagement with the shifting device whereby to render the latter operative and inoperative respectively, a locking arm normally preventing shifting movement of the gears, and means for releasing the gears from said locking arm when the shifting pin is engaged with the shifting device.

10. In variable speed gearing, the combination of coöperating gear members, one of said gear members consisting of gears of different diameters, a shifting device for said gears normally connected for rotation therewith and normally inoperative, a rock shaft, a shifting pin movable by said rock shaft into and out of engagement with the shifting device, whereby to render the latter operative and inoperative respectively, a locking shaft, an actuating arm associated with the rock shaft and operable on movement of the latter to throw the locking arm into and out of operative position.

11. In variable speed gearing, the combination of coöperating gear members, one of said gear members consisting of a plurality of gears of different diameters coöperating with the other member, and means for shifting one of said gear members with respect to the other for speed changing purposes, the same comprising a normally moving shifting device, a shifting member adapted to be thrown into and out of coöperation with the shifting device to render the same operative and inoperative respectively, and means for locking the movable gear member after the speed changing movement thereof is completed.

12. In variable speed gearing, the combination of coöperating gear members, one of said gear members consisting of a plurality of gears of different diameters coöperating with the other member, means for shifting one of said gear members with respect to the other for speed changing purposes, the same comprising a normally moving shifting device, a shifting member adapted to be thrown into and out of coöperation with the shifting device to render the same operative and inoperative respectively, means for locking the movable gear member after the speed changing movement thereof is completed, and a locking arm arranged for operation by the shifting member for locking the movable gear member after its speed changing movement has been completed.

13. In variable speed gearing, the combination of coöperative gear members, one of said gear members consisting of a plurality of gears of different diameters, a shifting device connected with one of the gears for effecting speed changing movement of the same, a shifting member for rendering the shifting device operative, and means on the shifting device for releasing the same from the shifting member after the speed changing operation has been completed.

14. In variable speed gearing, the combination of coöperating gear members, means for shifting one of said members to effect speed changing movement of the same and comprising a device normally inoperative, a shifting member for rendering said shifting device operative, means on said shifting device for releasing the same from the shifting member when a speed changing operation is completed, and locking means normally preventing speed changing movement of the movable gear member and coacting with the shifting member.

15. In variable speed gearing, the combination of coöperating gear members, means for effecting speed changing movement of one of said gear members, the same comprising a sleeve rotatable therewith, sets of cams on said sleeve for effecting reverse movement of the speed changing gear member, a shifting member, means for moving the shifting member into engagement with a predetermined one of the sets of cams aforesaid, and means on the sleeve for disengaging the shifting member from the cams after the speed changing operation has been completed.

16. In variable speed gearing, the combination of coöperating gear members, means for effecting speed changing movement of one of said gear members, the same comprising a sleeve rotatable therewith, sets of cams on said sleeve for effecting reverse movement of the speed changing gear member, a shifting member, means for moving the shifting member into engagement with a predetermined one of the sets of cams aforesaid, means on the sleeve for disengaging the shifting member from the cams after the speed changing operation is completed, and a locking bar coöperating with the shifting member for normally preventing engagement of the same with the sleeve cams, said bar being provided with means permitting coöperation of the speed changing member with the cams at predetermined points in the length of the bar.

17. In variable speed gearing, the combination of coöperating gear members, one of said gear members consisting of a plurality of gears of different diameters, gear paths leading from the pitch line of each gear to the pitch line of an adjacent gear, said gears comprising gear sections, and means for shifting the gear sections relative to one another to effect transition of the other gear member from a gear of one diameter to a gear of a different diameter.

18. In variable speed gearing, the combination of coöperating gear members, one of said gear members being yieldable and the other one comprising a plurality of gears of different diameters, gear paths leading from the pitch line of each gear to the pitch line of an adjacent gear and located between the gears, said gears being secured together side by side and split to form semi-circular gear sections, and means for imparting to the gear sections relative movement whereby to effect transition of the yieldable gear member from engagement with a gear of one diameter to engagement with a gear of a different diameter.

19. In variable speed gearing, the combination of coöperating gear members, one of said members comprising gears of different diameters, means for effecting transition of the other gear member from a gear of one diameter to a gear of a different diameter, said gear members having shroudings forming rolling contacts between the gears, and means yieldingly holding the gear members in coöperation.

In testimony whereof I affix my signature in presence of two witnesses.

ROY HANMORE GERARD.

Witnesses:
 HENRY W. ALLEN,
 MARY H. GERARD.

Copies of this patent may be obtained for five cents each, by addressing the "Commissioner of Patents, Washington, D. C."